BEST AVAILABLE COPY

2 Sheets—Sheet 1.

G. L. MERRELL.

Assignor to the BURT MANUFACTURING COMPANY.

MACHINE FOR CLEANING THE TOPS OF CANS.

No. 11,175. Reissued July 7, 1891.

Witnesses:
Theo. L. Popp.
Jennie T. Clough.

Gaius Lewis Merrell, Inventor.
By Wilhelm & Boomer,
Attorneys.

EXAMINER.
2 Sheets—Sheet 2.
G. L. MERRELL.
Assignor to the BURT MANUFACTURING COMPANY.
MACHINE FOR CLEANING THE TOPS OF CANS.
No. 11,175. Reissued July 7, 1891.
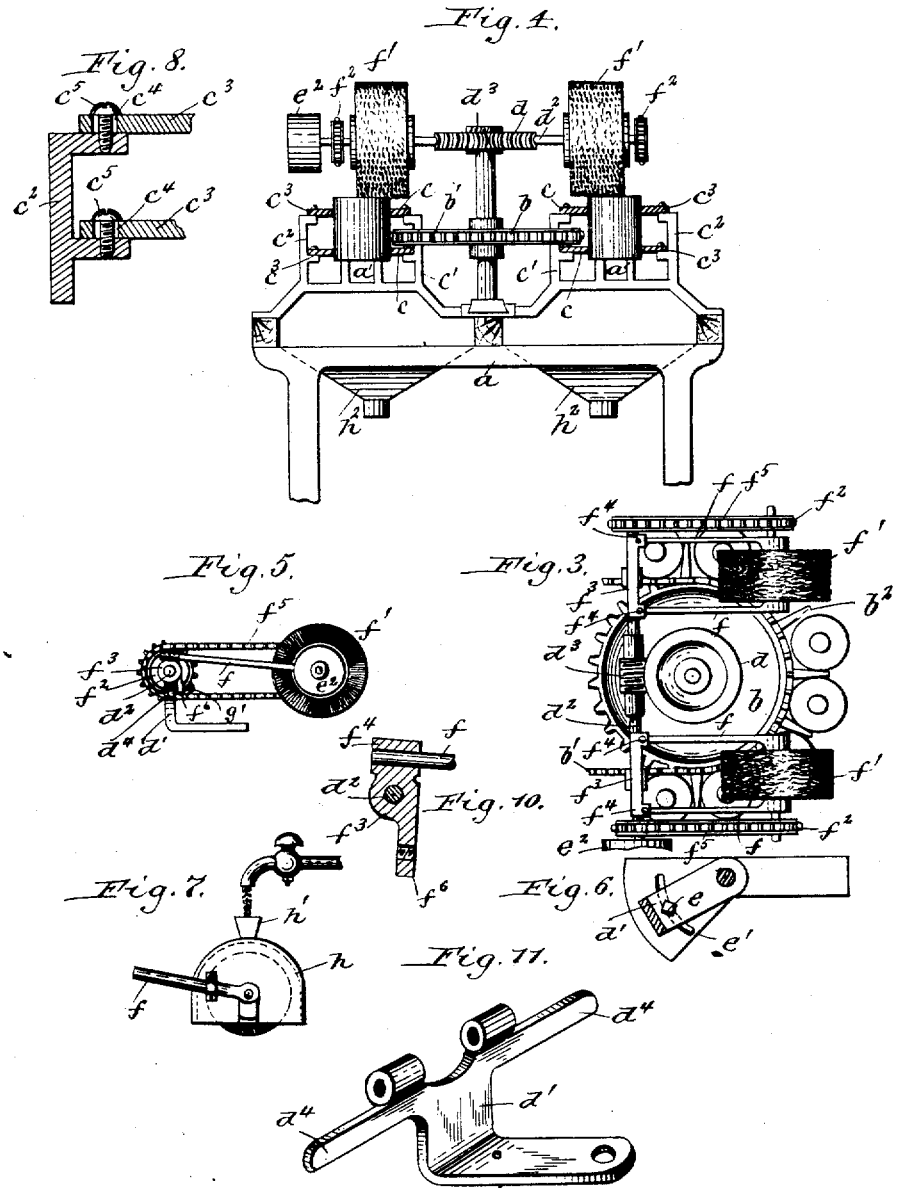
Witnesses:
Theo. L. Popp.
Jennie T. Clough.
Gaius Lewis Merrell, Inventor.
By Wilhelm & Boner
Attorneys.
THE NORRIS PETERS CO., PHOTO-LITHO. WASHINGTON, D. C.

UNITED STATES PATENT OFFICE.

GAIUS LEWIS MERRELL, OF SYRACUSE, ASSIGNOR TO THE BURT MANUFACTURING COMPANY, OF ROCHESTER, NEW YORK.

MACHINE FOR CLEANING THE TOPS OF CANS.

SPECIFICATION forming part of Reissued Letters Patent No. 11,175, dated July 7, 1891.

Original No. 436,836, dated September 23, 1890. Application for reissue filed May 22, 1891. Serial No. 393,790.

*To all whom it may concern:*

Be it known that I, GAIUS LEWIS MERRELL, of Syracuse, in the county of Onondaga, in the State of New York, have invented new and useful Improvements in Machines for Cleaning the Tops of Cans, of which the following, taken in connection with the accompanying drawings, is a full, clear, and exact description.

This invention relates to machines for cleaning cans previous to sealing; and it consists in certain peculiarities of the construction and arrangement of the same, substantially as will be hereinafter more fully set forth and claimed.

In order to enable others skilled in the art to which my invention pertains to make and use the same, I will now proceed to describe its construction and operation, referring to the accompanying drawings, in which—

Figure 1:
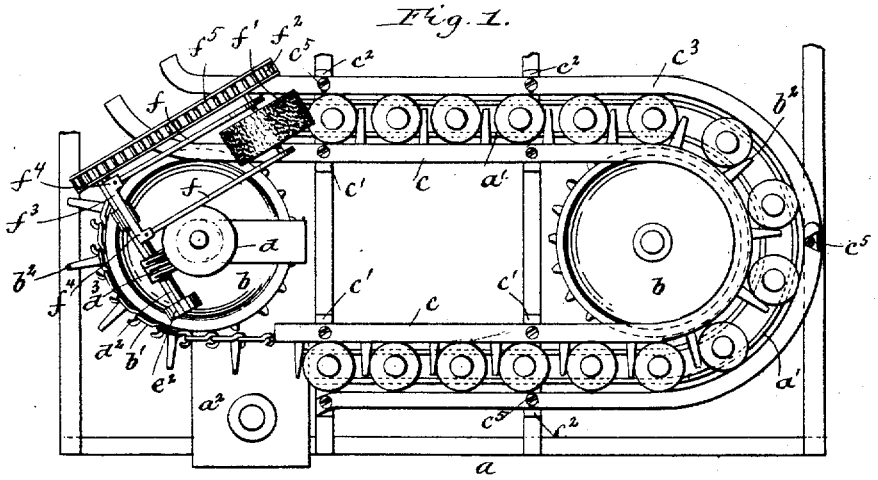
Figure 2:
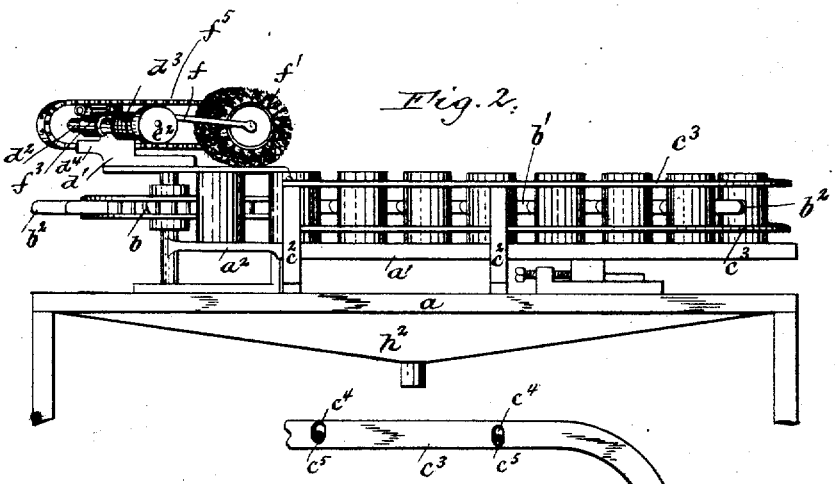
Figure 9:
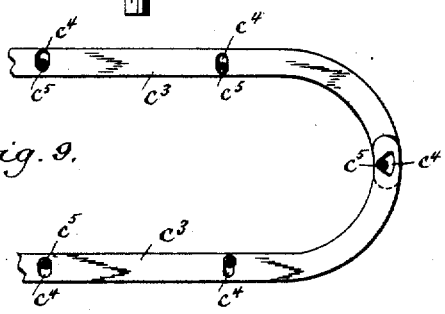

Figure 1 is a top plan view of my machine; Fig. 2, a side elevation of the same; Fig. 3, a plan of one end of the machine, showing two brushes in use; Fig. 4, a transverse section of the same. Fig. 5 is a detail side view of the brush and its supporting-bracket. Fig. 6 is a plan of the mode of securing and adjusting this bracket. Fig. 7 shows the hood which is placed over the brush when water is used with it. Fig. 8 is a detail section of the adjustable guide-rail. Fig. 9 is a top plan view of the rail shown in Fig. 8, still further illustrating the same. Fig. 10 is an enlarged detail of the bearing in which the arms $f$ are secured; and Fig. 11 is an isometric view of the bracket supporting the brushes.

$a$ represents the main frame of my machine, of suitable size and form, provided with a pair of rails, forming a track $a'$, which extends from the feeding-table $a^2$ at one end of the main frame, down one side, around the end, and up the other side of the machine to the point of discharge, as will be seen in the drawings. In each end of the machine is journaled a large sprocket-wheel $b$, over which runs an endless carrier-chain $b'$, provided at suitable intervals with arms $b^2$, which project over the track $a'$ and serve, as shown, to carry the cans through the machine. On either side of the track $a'$ and projecting above the same are standards, and to the inner standards $c'$ I secure the guide-rails $c$ $c$, mounted one above the other, and upon the standards $c^2$ on the outside of the track $a'$ I secure like guide-rails $c^3$, which are provided with slots $c^4$, through which are passed the clamping screws or bolts $c^5$, engaging the brackets $c^2$. When, after feeding cans of a given size through my machine, it is necessary to feed cans of another size, it will be observed that these clamping screws or bolts $c^5$ may be loosened and the outer rails $c^3$ adjusted to the desired distance from the inner guide-rails $c$, and in order to allow this adjustment of the rails at the bend I preferably make the outer guide-rails of two separate pieces joined together at the center and provide the same with a suitable aperture or opening, so that when the guide-rails are adjusted along their straight portion the curved part of the same can also be adjusted, as shown in Figs. 1 and 9.

Upon the shaft of the rear sprocket-wheel $b$ is secured a worm-wheel $d$, and in the bracket $d'$ on the frame is journaled a horizontal shaft $d^2$, provided with a worm $d^3$, which engages and drives the worm-wheel, and through it imparts motion to the sprocket-wheels and their endless carriers, as will clearly appear by an inspection of the drawings. The bracket $d'$, as will more clearly be noted in Fig. 6, is pivoted on the sprocket-wheel shaft, and is provided with a clamping-screw $e$, working in a curved slot $e'$ in the frame, so that the bracket may be readily set at an angle, and the shaft $d^2$ is therefore supported at an angle transversely to the main frame, and this angle is varied at pleasure by adjusting the pivoted bracket. Upon one end of the shaft $d^2$ is secured a pulley $e^2$, to which power is transmitted in any suitable manner from any desired motor. Hinged upon the shaft $d^2$ is a bracket $f^3$, to opposite arms $f^4$ of which are secured the arms $f$, in the outer ends of which is journaled a vertically-revolving brush $f'$, driven by means of a sprocket-wheel $f^2$, connected by a chain $f^5$ with a similar wheel on the shaft $d^2$, as illustrated. The arms $f$ are of sufficient size to permit the brush to rest and revolve upon the tops of the line of cans as they are carried beneath it in the guide-track, and to rub all dirt and foreign matter of any kind are effectually cleaned off the tops of the cans previous to their being sealed. The bracket $f^3$ swings on the shaft $d^2$ as a pivot, and projecting downwardly from said bracket is the arm $f^6$, (shown in Figs. 5 and 10,) in which is secured a regulating-screw $g'$. The extremity of said regulating-screw bears upon the arm $d^4$ of the bracket $d'$, (shown in Fig. 11,) and as the screw $g'$ is turned into the depending projection $f^6$ the said projection is forced away from the bracket $d'$ and the brush is elevated. By this means it will be seen that the brush can be allowed to rest against the can-top with greater or less force, accordingly as the brush is elevated or depressed.

The cans are filled with the material intended, and as no perfect soldering or sealing of the can-top can be had unless all dirt is removed and a clean surface of the can exposed, they are placed in this machine, and by means of the carrier-belt and its projecting arms are carried around beneath the brush, which is rapidly revolved, and effectually cleans them preparatory to sealing. Two points will be noted in connection with the cleaning-brush, one of which is that it is revolved in a vertical position and the other that it is held at an angle to the line of motion of the cans.

In the use of the horizontally-revolving brushes often used in similar machines the brushes do not have a chance to clear themselves, but soon become clogged and stiff with the matter brushed off the tops of the cans, particularly if the contents of the cans are of a sticky nature and a little is spilled over the can in filling it. My brush revolving vertically has room to throw off this matter and clear itself and at the same time more effectually enters the circular indentation, which usually surrounds the central opening of such cans. By placing the brush at an angle to the line of motion of the can it will be understood that as the carrier feeds the cans toward the brush the combined force of the two—that is, the straightforward motion of the carrier and the rotation of the brush at an angle to the line of motion of the carrier—will, if the brush rests with a degree of force upon the can, revolve the same during the operation of the brush as the cans are fed thereto. By thus revolving the can by the combined action of the carrier and the brush it will be observed that a feature of great advantage accrues, since the circular inlet-opening in the top of the can can be more effectually cleaned, and this revolving of the can is a feature of great advantage. Moreover, as the brush is at an angle to the line of motion of the carrier, the sharp edges of the central opening of the can pass entirely across the face of the brush and so wear the brush evenly and form no ridges, as is the case where this angular position is not adhered to, thereby greatly extending the life and usefulness of the brush.

In order to prevent the cans being brushed from the carrier by the action of the vertically-revolving brush, I provide guides for the cans, which extend a desired distance above the plane of the base of the cans and effectually prevent their dislodgment.

I do not desire to confine myself to the use of one brush or to its particular location, as described, and seen in Figs. 1 and 2, as this may be varied with a good effect without in any way departing from the spirit of my invention. Thus in Figs. 3 and 4 I have illustrated a somewhat modified form of machine embodying exactly the same principles as the other. In this case the main frame, can-guide, sprocket-wheels, and endless carrier are made and used as previously described. The worm-wheel and its worm-shaft and bracket are in this case placed upon the forward sprocket, and the worm-shaft $d^2$ may extend transversely across the machine at right angles to its length. Two brushes $f'$ are used, one on each end of the shaft, arranged and driven exactly as before described. It will be observed that these brushes rest upon the line of passing cans upon the curve in which they are carried around the end of the machine, and that in consequence each brush revolves at an angle to the line of motion of the can just as described, and produces the same result thereby.

Two brushes are sometimes necessary when the nature of the contents of the cans renders them difficult to clean, &c., and in some cases I provide one of the brushes with a hood $h$, as in Fig. 7, having an opening or funnel $h'$ on its upper side, through which water is supplied to the brush from any convenient source to aid in cleaning the can and prevent the brush from clogging, &c. When this is used, I provide the main frame beneath the track with a pan $h^2$, into which the water thrown off the brush falls and is conducted off, as desired. This form of machine, while quite different in appearance, is exactly the same in effect and operation as that first described, and is in no sense a departure from the spirit of my invention.

It is obvious that the bottom of the can-guide may be solid, instead of composed of the track shown; but I prefer the open construction illustrated, as it permits all dirt and other matter to fall through, and there is nothing to interfere with the passage of the can.

The manner of adjusting the outer guide-rail might be somewhat varied, and, also, if desired, the inner guide-rail might be adjustable, or one guide-rail on either side of the track $a'$ might be used, instead of the two now used; but such is not my preferred construction of the parts.

Having thus fully described my invention, what I claim as new, and desire to secure by Letters Patent, is—

1. In a machine for cleaning the tops of cans, the combination, with the guideway and the can-carrier for moving the cans through the machine, of a revolving brush arranged above the guideway.

..ING, SCRUBBING,
NERAL CLEANING.
J

2. In a machine for cleaning the tops of cans, the combination, with the guideway and the feed or carrier for moving the cans through the machine, of a vertically-revolving cleaning-brush set at an angle to the line of motion of the carrier, substantially as and for the purpose specified.

3. The combination, with a guideway and a carrier for moving the cans, of a brush set at an angle to the line of motion of the carrier and adjustable thereto so as to brush off the cans at a greater or less angle to the line of motion of the carrier, substantially as and for the purpose specified.

4. In a machine for cleaning the tops of cans, the combination, with the main frame, the guideway, and the can feed or carrier, of a revolving cleaning-brush, a hinged support for said brush for approximating the same to the can feed or carrier, and a screw for adjusting said hinged support to move the brush toward and away from the can-feed, substantially as and for the purpose set forth.

5. The combination of the supporting-frame, a guideway for the cans, an adjustable guide-rail adjusting the guideway to any-sized can, with a brush for cleaning the tops of the cans, substantially as and for the purpose set forth.

6. The combination, with a brush set at an angle to the line of motion of the cans, of an adjustable guideway for the cans, substantially as and for the purpose specified.

7. In a machine for cleaning the tops of cans, the combination of the main supporting-frame provided with parallel bars or rails forming a guideway for the cans, one of which is slotted and provided with clamping-screws, whereby said guideway may be adjusted to suit different-sized cans, substantially as and for the purpose set forth.

8. The combination, with the main supporting-frame, of a support for the base of the cans, guide-rails above said support for guiding the cans, one of which guide-rails is adjustable to suit different-sized cans, and a feed or carrier for feeding the cans through said guide-rails, substantially as and for the purpose specified.

9. In a machine for cleaning the tops of cans, the combination, with the main supporting-frame provided with parallel bars forming a track upon which the cans move, of guide-rails upon each side of said track, one of which guide-rails is slotted and provided with clamping-screws, whereby said rails may be adjusted to suit different-sized cans, substantially as and for the purpose specified.

10. In a machine for cleaning the tops of cans, the combination, with the main supporting-frame, of guide-rails forming a U-shaped guideway for the cans, one of which guide-rails is composed of two parts hinged together at the curved central portion of the U and adjustable toward and away from the opposite guide-rail, substantially as and for the purpose specified.

11. The combination, with the brush revolved to clean the tops of the cans, of a guideway for the can, and a belt having arms actuated to feed the cans through the guideway, substantially as and for the purpose specified.

12. In a machine for cleaning the tops of cans, the combination, with the main frame, of the can-guide, a pair of sprocket-wheels, and an endless carrier-chain passing over said wheels and provided with arms for engaging the cans and feeding the same through the guideway, substantially as and for the purpose specified.

13. In a machine for cleaning the tops of cans, the combination, with a main frame, a can-guide, a pair of sprocket-wheels, and an endless-chain carrier passing over said wheels, of an adjustable bracket pivoted upon the shaft of one of the sprocket-wheels, an arm hinged to said bracket, and a revolving brush supported by said arm, whereby the angle of the brush is changed by adjusting the bracket, substantially as and for the purpose specified.

Witness my hand this 4th day of March, 1891.

GAIUS LEWIS MERRELL.

Witnesses:
C. F. GEYER,
JENNIE CLOUGH.